US012475910B2

(12) United States Patent
Jawahar et al.

(10) Patent No.: US 12,475,910 B2
(45) Date of Patent: Nov. 18, 2025

(54) SYSTEM AND METHOD FOR AUTOMATICALLY GENERATING A SIGN LANGUAGE VIDEO WITH AN INPUT SPEECH USING A MACHINE LEARNING MODEL

(71) Applicant: International Institute of Information Technology, Hyderabad, Hyderabad (IN)

(72) Inventors: C. V. Jawahar, Hyderabad (IN); Parul Kapoor, Kanpur (IN); Sindhu B Hegde, Hyderabad (IN); Rudrabha Mukhopadhyay, Hyderabad (IN); Vinay Namboodiri, Hyderabad (IN)

(73) Assignee: INTERNATIONAL INSTITUTE OF INFORMATION TECHNOLOGY, HYDERBAD, Hyderabad (IN)

( * ) Notice: Subject to any disclaimer, the term of this patent is extended or adjusted under 35 U.S.C. 154(b) by 275 days.

(21) Appl. No.: 18/120,374

(22) Filed: Mar. 11, 2023

(65) Prior Publication Data
US 2023/0290371 A1 Sep. 14, 2023

(30) Foreign Application Priority Data
Mar. 11, 2022 (IN) .............................. 202241013436

(51) Int. Cl.
*G10L 21/10* (2013.01)
*G06T 13/40* (2011.01)
*G10L 25/30* (2013.01)

(52) U.S. Cl.
CPC .............. *G10L 21/10* (2013.01); *G06T 13/40* (2013.01); *G10L 25/30* (2013.01)

(58) Field of Classification Search
CPC ......... G10L 21/10; G10L 25/30; G06T 13/40; G06T 13/205; G09B 21/009
See application file for complete search history.

(56) References Cited

U.S. PATENT DOCUMENTS

| 7,676,372 B1 * | 3/2010 | Oba ..................... G09B 21/009 |
| | | 704/271 |
| 11,935,170 B1 * | 3/2024 | Jain ........................ G06V 40/28 |

(Continued)

FOREIGN PATENT DOCUMENTS

| CN | 110570877 A | * | 12/2019 | ............. G10L 21/06 |
| KR | 102174922 B1 | * | 11/2020 | ............. G10L 21/10 |
| KR | 20210055235 A | * | 5/2021 | ............. G06T 13/40 |

*Primary Examiner* — Andrew C Flanders
*Assistant Examiner* — Cameron Kenneth Young (57) ABSTRACT

Embodiments herein provide a system and method for automatically generating a sign language video from an input speech using the machine learning model. The method includes (i) extracting a plurality of spectrograms of an input speech by (a) encoding, using an encoder, a time domain series of the input speech to a frequency domain series, and (b) decoding, using a decoder, a plurality of tokens for time steps of the frequency domain series, (ii) generating a plurality of pose sequences for a current time step of the plurality of spectrograms using a first machine learning model, and (iii) automatically generating, using a discriminator of a second machine learning model, a sign language video for the input speech using the plurality of pose sequences and the plurality of spectrograms when the plurality of pose sequences are matched with corresponding the plurality of spectrograms that are extracted.

13 Claims, 7 Drawing Sheets

(56) References Cited

U.S. PATENT DOCUMENTS

| | | |
|---|---|---|
| 12,205,211 B2* | 1/2025 | Brandon ................. G06F 40/20 |
| 2019/0318755 A1* | 10/2019 | Tashev ................... G06N 3/045 |
| 2021/0043110 A1* | 2/2021 | Jung ....................... G10L 15/24 |
| 2021/0174034 A1* | 6/2021 | Retek ...................... G06F 3/017 |
| 2022/0036050 A1* | 2/2022 | Chandler ............... G06V 10/82 |
| 2023/0035306 A1* | 2/2023 | Liu ...................... H04N 19/597 |
| 2023/0210451 A1* | 7/2023 | Omiya ................ A61B 5/4088 |
| | | 600/586 |

* cited by examiner

EXTRACTING A PLURALITY OF SPECTROGRAMS OF AN INPUT SPEECH BY (I) ENCODING, USING AN ENCODER, A TIME DOMAIN SERIES OF THE INPUT SPEECH TO A FREQUENCY DOMAIN SERIES AND, (II) DECODING, USING A DECODER, A PLURALITY OF TOKENS FOR TIME STEPS OF THE FREQUENCY DOMAIN SERIES
602

GENERATING ONE OR MORE POSE SEQUENCES FOR A CURRENT TIME STEP USING A FIRST MACHINE LEARNING MODEL
604

AUTOMATICALLY GENERATING, USING A SECOND MACHINE LEARNING MODEL, A SIGN LANGUAGE VIDEO FOR THE INPUT SPEECH USING THE ONE OR MORE POSE SEQUENCES AND THE PLURALITY OF SPECTROGRAMS WHEN THE ONE OR MORE POSE SEQUENCES ARE MATCHED WITH CORRESPONDING PLURALITY OF SPECTROGRAMS THAT ARE EXTRACTED
606

SYSTEM AND METHOD FOR AUTOMATICALLY GENERATING A SIGN LANGUAGE VIDEO WITH AN INPUT SPEECH USING A MACHINE LEARNING MODEL

CROSS-REFERENCE TO RELATED APPLICATIONS

This patent application claims priority to Indian provisional patent application no. 202241013436 filed on Mar. 11, 2022, the complete disclosures of which, in their entirety, are hereby incorporated by reference.

BACKGROUND

Technical Field

Embodiments of this disclosure generally relate to automatically generating a sign language video using a machine learning model, and more particularly, to a system and method for automatically generating a sign language video from an input speech using the machine learning model with improved sign gestures and speaker's emotion.

DESCRIPTION OF THE RELATED ART

Sign language is a language that are used by most of the deaf people to convey anything to the other person. The sign language is expressed through manual articulations including hand gestures, hand-shape, location, movement, orientation in combination with non-manual elements including facial expressions such as eye gaze, eyebrows, and mouth movement. Although signing is used by the deaf people and hard to hear people, the sign language also used by the people who unable to physically speak.

The sign language can be represented in human-readable form using glosses and text transcripts. But annotating at gloss level is a tedious task and limits datasets to a smaller size. Most of the sign language platforms are focused on using text as an input modality, that consumes more time and energy, thereby inherently limiting. The sign language is a communication medium that communicates the speech the user has to convey, but the sign language platforms using text as the input modality, misses the speaker's emotion (i.e. user's emotion) and other attributes when converting the text to the sign language. The existing solutions are limited by using the text as the input and creating the sign language video based on the text input, that may not include the speaker's emotion.

Accordingly, there remains a need for a system and method for generating a sign language video.

SUMMARY

In view of the foregoing, an embodiment herein provides a method for automatically generating a sign language video from an input speech using a machine learning model. The method includes extracting a plurality of spectrograms of an input speech by (i) encoding, using an encoder, a time domain series of the input speech to a frequency domain series, and (ii) decoding, using a decoder, a plurality of tokens for time steps of the frequency domain series. Each spectrogram comprises at least one visual representation of a strength of the input speech over time, the input speech is obtained from a user device associated with a user. The method includes generating a plurality of pose sequences for a current time step of the plurality of spectrograms using a first machine learning model. The first machine learning model is trained by correlating historical pose sequences of historical users in historical sign language videos with historical spectrograms of historical input speeches. The method includes automatically generating, using a discriminator of a second machine learning model, a sign language video for the input speech using the plurality of pose sequences and the plurality of spectrograms when the plurality of pose sequences are matched with corresponding the plurality of spectrograms that are extracted.

In some embodiments, the method includes retraining the second machine learning model with a loss function if there is a discrimination between at least one of ground truth spectrograms, ground truth pose sequences, ground truth input speech and generated plurality of pose sequences, generated sign language video.

In some embodiments, the method includes decoding, using a pose decoder, at least one pose corresponding to each time step in the input speech and inserting a contextual information to the time domain series of the input speech.

In some embodiments, the method includes determining required historical video portions by cutting the historical sign language videos using a start clip and an end clip.

In some embodiments, the method includes generating the historical pose sequences from the historical video portions cut from the historical sign language videos by (i) extracting feature maps from each historical video portion, the historical sign language videos are extracted from a plurality of data sources, (ii) generating part confidence maps and part affinity fields based on the feature maps that are extracted, each part confidence map represents a two-dimensional map for body part locations of each user, each joint location of the body part locations has the two-dimensional map, each part affinity field is a two-dimensional vector that encodes a degree of association between the body part locations, and (iii) obtaining, using a bipartite matching method, the historical pose sequences of the historical users from the historical video portions by matching the part confidence maps so that no two-part confidence maps share an end point.

In some embodiments, the method includes training the second machine learning model using a generative adversarial network (GAN) model that comprises (a) a generator that is trained to (i) generate the plurality of pose sequences, (ii) generate the sign language video for the input speech, and (b) the discriminator that is trained to discriminate between at least one of ground truth spectrograms, ground truth pose sequences, ground truth input speech and generated plurality of pose sequences, generated sign language video.

In one aspect, there is provided one or more non-transitory computer-readable storage medium storing the one or more sequence of instructions, which when executed by the one or more processors, causes to perform a method for automatically generating a sign language video from an input speech using a machine learning model. The method includes extracting a plurality of spectrograms of an input speech by (i) encoding, using an encoder, a time domain series of the input speech to a frequency domain series, and (ii) decoding, using a decoder, a plurality of tokens for time steps of the frequency domain series. Each spectrogram comprises at least one visual representation of a strength of the input speech over time, the input speech is obtained from a user device associated with a user. The method includes generating a plurality of pose sequences for a current time step of the plurality of spectrograms using a first machine learning model. The first machine learning model is trained by correlating historical pose sequences of historical users in historical sign language videos with historical spectrograms of historical input speeches. The method includes automatically generating, using a discriminator of a second machine learning model, a sign language video for the input speech using the plurality of pose sequences and the plurality of spectrograms when the plurality of pose sequences are matched with corresponding the plurality of spectrograms that are extracted.

In another aspect, there is provided a system for automatically generating a sign language video from an input speech using a machine learning model. The system includes a memory that stores a database and a set of modules, a processor in communication with the memory. The processor retrieves executing machine-readable program instructions from the memory which, when executed by the processor, enable the processor to (i) extract a plurality of spectrograms of an input speech by (a) encoding, using an encoder, a time domain series of the input speech to a frequency domain series, and (b) decoding, using a decoder, a plurality of tokens for time steps of the frequency domain series, each spectrogram comprises at least one visual representation of a strength of the input speech over time, the input speech is obtained from a user device associated with a user, (ii) generate a plurality of pose sequences for a current time step of the plurality of spectrograms using a first machine learning model, the first machine learning model is trained by correlating historical pose sequences of historical users in historical sign language videos with historical spectrograms of historical input speeches, (iii) automatically generate, using a discriminator of a second machine learning model, a sign language video for the input speech using the plurality of pose sequences and the plurality of spectrograms when the plurality of pose sequences are matched with corresponding the plurality of spectrograms that are extracted.

In some embodiments, the processor is configured to retrain the second machine learning model with a loss function if there is a discrimination between at least one of ground truth spectrograms, ground truth pose sequences, ground truth input speech, and generated plurality of pose sequences, generated sign language video.

In some embodiments, the processor is configured to decode, using a pose decoder, at least one pose corresponding to each time step in the input speech and inserting a contextual information to the time domain series of the input speech.

In some embodiments, the processor is configured to determine required historical video portions by cutting the historical sign language videos using a start clip and an end clip.

In some embodiments, the processor is configured to generate the historical pose sequences from the historical video portions cut from the historical sign language videos by (i) extracting feature maps from each historical video portion, the historical sign language videos are extracted from a plurality of data sources, (ii) generating part confidence maps and part affinity fields based on the feature maps that are extracted, each part confidence map represents a two-dimensional map for body part locations of each user, each joint location of the body part locations has the two-dimensional map, each part affinity field is a two-dimensional vector that encodes a degree of association between the body part locations, and (iii) obtaining, using a bipartite matching method, the historical pose sequences of the historical users from the historical video portions by matching the part confidence maps so that no two-part confidence maps share an end point.

In some embodiments, the processor is configured to train the second machine learning model using a generative adversarial network (GAN) model that comprises (a) a generator that is trained to (i) generate the plurality of pose sequences, (ii) generate the sign language video for the input speech, and (b) the discriminator that is trained to discriminate between at least one of ground truth spectrograms, ground truth pose sequences, ground truth input speech and generated plurality of pose sequences, generated sign language video.

The system generates the sign language poses automatically with the input speech. The system provides the sign language videos with the sign language pose sequences that provides two-sided communication between the hearing impaired and the rest of the world. The dataset in the system with speech modality avoids expensive gloss annotations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method for automatically generating a sign language video from an input speech using the machine learning model with improved sign gestures and speaker's emotion. Referring now to the drawings, and more particularly to FIGS. 1 through 7, where similar reference characters denote corresponding features consistently throughout the figures, there are shown preferred embodiments.

Figure 1:
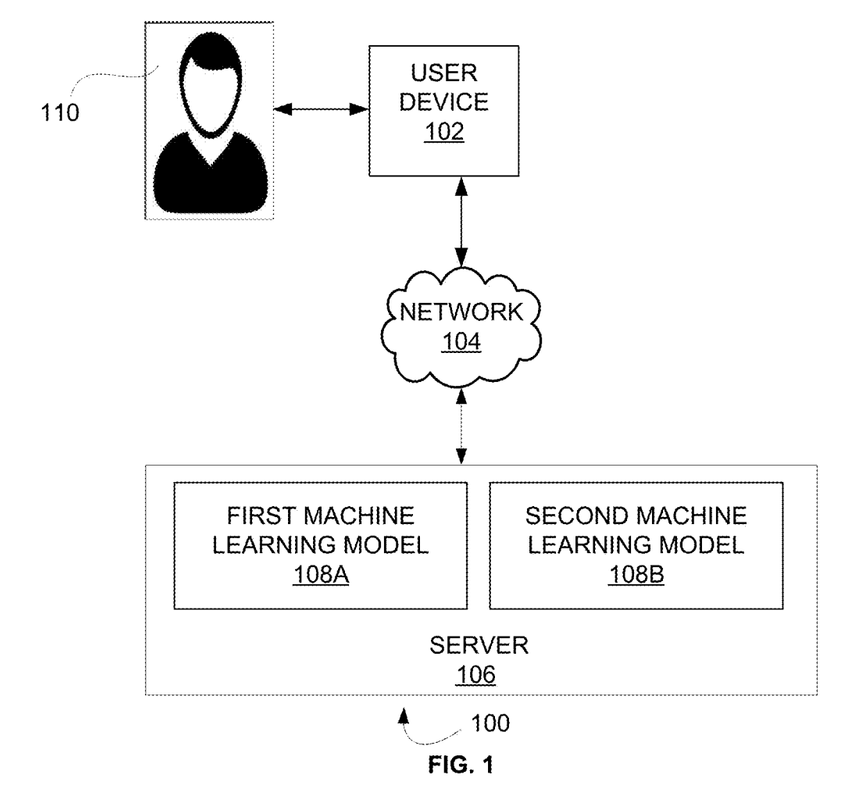
FIG. 1 is a block diagram that illustrates a system for automatically generating a sign language video from an input speech using a machine learning model according to some embodiments herein.

FIG. 1 is a block diagram that illustrates a system 100 for automatically generating a sign language video from an input speech using the machine learning model 108 according to some embodiments herein. The system 100 includes a user device 102, and a server 106. The user device 102 is configured to provide an input speech to the server 106 through a network 104. The input speech may be an instruction to generate the sign language video. In some embodiments, the user device 102 is associated with a user, sends a speech as the input to the server 106 through the network 104. In some embodiments, the user device 102, without limitation, may be selected from a mobile phone, a Personal Digital Assistant (PDA), a tablet, a desktop computer, or a laptop. In some embodiments, the network 104 includes, but is not limited to, a wireless network, a wired network, a combination of the wired network and the wireless network, or the Internet and the like.

The user device 102 may include a mobile application that enables the user 110 to send the speech. In some embodiments, the mobile application includes a record option to record the speech and send the speech to the server 106.

The server 106 is configured to extract a plurality of spectrograms of the input speech by (a) encoding, using an encoder, a time domain series of the input speech to a frequency domain series, and (b) decoding, using a decoder, a plurality of tokens for time steps of the frequency domain series. Each spectrogram comprises at least one visual representation of a strength of the input speech over time.

In some embodiments, a pose decoder decodes at least one pose corresponding to each time step in the input speech and inserts a contextual information to the time domain series of the input speech.

The server 106 is configured to collect the one or more sign language videos from one or more data sources through the network 104. In some embodiments, the server 106 collects the one or more sign language videos by scraping one or more videos from the internet. The one or more videos may be smaller videos including face videos, YouTube videos, streaming videos, movie videos, and the like, with the sign language. The server 106 may scrape only the sign language videos from the one or more videos. The one or more sign language videos may include real-world variations in speaker identity. In some embodiments, the real-world variations in the speaker identity include any of a complexion, a gender, an age, a pose, an accent, and the like. In some embodiments, the server 106 includes a separate storage to store the one or more sign language videos. The one or more sign language videos may be stored in the database of the server 106.

The server 106 is configured to generate a plurality of pose sequences for a current time step of the plurality of spectrograms using a first machine learning model 108A. The first machine learning model 108A is trained by correlating historical pose sequences of historical users in historical sign language videos with historical spectrograms of historical input speeches. The one or more sign language videos without poses may be discarded for generating the historical sign language videos which reduces a manual effort of curation. The video validation is provided that includes checking accuracy of the one or more sign language videos for generating the historical sign language videos.

In some embodiments, the required historical video portions are determined by cutting the historical sign language videos using a start clip and an end clip. In some embodiments, the historical pose sequences are generated from the historical video portions cut from the historical sign language videos by (i) extracting feature maps from each historical video portion, the historical sign language videos are extracted from a plurality of data sources, (ii) generating part confidence maps and part affinity fields based on the feature maps that are extracted, each part confidence map represents a two-dimensional map for body part locations of each user, each joint location of the body part locations has the two-dimensional map, each part affinity field is a two-dimensional vector that encodes a degree of association between the body part locations, and (iii) obtaining, using a bipartite matching method, the historical pose sequences of the historical users from the historical video portions by matching the part confidence maps so that no two-part confidence maps share an end point.

In some embodiments, the historical sign language videos are stored in the database of the server 106. In some embodiments, the server 106 cuts out a required video portion from the one or more sign language videos to generate one or more sign language videos for words using a start clip and an end clip. The one or more sign language videos for words may be stored in the database of the server 106. The one or more sign language videos may include videos covering one or more topics including any of current affairs, sports, and world news. In some embodiments, the one or more sign language videos are stored as the historical sign language videos.

The one or more pose sequences may be related to the input speech that are stored in the database of the server 106. The server 106 is configured to automatically generate a sign language video for the input speech using the plurality of pose sequences and the plurality of spectrograms when the plurality of pose sequences are matched with corresponding the plurality of spectrograms that are extracted using a discriminator of a second machine learning model 108B.

In some embodiments, the second machine learning model 108B is trained using a generative adversarial network (GAN) model that comprises (a) a generator that is trained to (i) generate the plurality of pose sequences, (ii) generate the sign language video for the input speech, and (b) the discriminator that is trained to discriminate between at least one of ground truth spectrograms, ground truth pose sequences, ground truth input speech and generated plurality of pose sequences, generated sign language video.

In some embodiments, the second machine learning model 108B is retrained with a loss function if there is a discrimination between at least one of ground truth spectrograms, ground truth pose sequences, ground truth input speech and generated plurality of pose sequences, generated sign language video.

In some embodiments, the system 100 includes a language model to control the language, an accent, and a duration of speech, and includes an alignment module that aligns the input speech with the pose sequence, thereby eliminating false pose sequences. The database may store instructions to generate the sign language video with the input speech. The system 100 may include a memory that stores instructions and a processor that executes the stored instructions to generate the sign language video with the input speech.

The system 100 may include a multi-task transformer to generate the pose sequences for the sign language and generating of the sign language video for the input speech. In some embodiments, the system 100 provides encompassing of providing sign language videos for any language with variations in speaker identity. The system 100 may generate the sign language videos with real-world variations including any of a person, a distance of a person from a camera, and the like.

Figure 2:
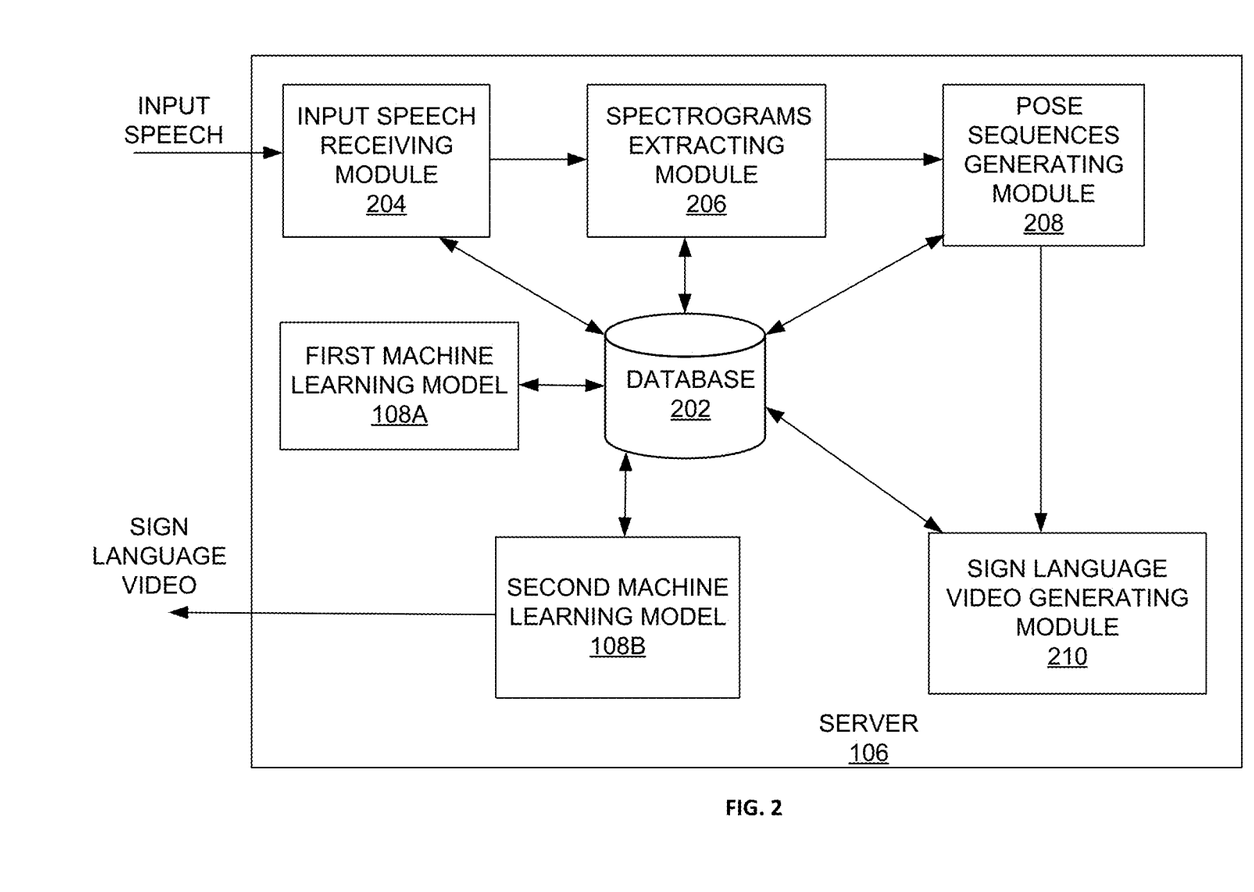
FIG. 2 is a block diagram of a server according to some embodiments herein.

FIG. 2 is a block diagram of the server 106 according to some embodiments herein. The server 106 includes a database 202, an input speech receiving module 204, a spectrograms extracting module 206, a pose sequences generating module 208, a sign language video generating module 210, the first machine learning model 108A, and the second machine learning model 108B. The input speech receiving module 204 obtains the input speech from the 102 user device associated with the user 110.

The spectrograms extracting module 206 extracts a plurality of spectrograms of an input speech by encoding a time domain series of the input speech to a frequency domain series using an encoder. The spectrograms extracting module 206 decodes a plurality of tokens for time steps of the frequency domain series using a decoder. Each spectrogram comprises at least one visual representation of a strength of the input speech over time.

The spectrograms extracting module 206 projects the input melspectrogram of shape $T_s \times 80$, where $T_s$ is a number of STFT time steps into a dense continuous space using a linear layer. In some embodiments, the encoder applies a standard positional encoder, that use N multi-head self-attention layers with M heads and a position-wise feed-forward layer. Each of the two sub-layers include residual connections and layer normalization. The spectrograms extracting module 206 may produce outputs of dimension $d_{model}$ and the final embedding is represented by $Z=\{Z1, Z2, \ldots Zn\}$.

The decoder is configured to decode tokens in a sequence with positionally encoded input tokens at time step i until an end of sequence token is produced. In some embodiments, the decoder inputs the masked text translations of length Q. The decoder may be a transformer decoder block for discrete vocabulary. In some embodiments, the decoder includes masked multi-head self-attention blocks followed by cross attention with the speech context embeddings and non-linear point-wise feed-forward layers, with a formula:

$$h_i = TD(t_{i-1}|z_{1:n}, t_{1:i-2})$$

Where $h_i$ is the output embedding from the decoder, $t_{i-1}$ is the word embedding for the token $t_{i-1}$ at $(i-1)^{th}$ time step, and $z_{1:n}$ is the contextual embedding of the speech input S. Output at every time step $h_i$ may be used to obtain a softmax probability over the target vocabulary V. In some embodiments, a cross entropy loss is computed and back-propagated over the network.

The pose sequences generating module 208 is configured to generate a plurality of pose sequences for a current time step of the plurality of spectrograms using the first machine learning model 108A. In some embodiments, the pose sequences generating module 208 inputs a masked pose sequence of dimension for the input speech. The masked pose sequence of dimension may be (m×151). The poses for frames may be projected to a dense continuous space using a linear layer. In some embodiments, the pose sequences generating module 208 guides a generation process with discrete vocabulary, including a counter in a range of 0 to 1 to every frame's pose. The first machine learning model 108A is trained by correlating historical pose sequences of historical users in historical sign language videos with historical spectrograms of historical input speeches. The first machine learning model 108A implements positional encoding and N masked multi-head self-attention layers with M heads that produce embeddings of dimension $d_{model}$. The first machine learning model 108A may include attending N multi-head cross-modal attention layers to speech embeddings that models the translation between the speech and the pose. In some embodiments, the first machine learning model 108A includes a position-wise feed-forward layer followed by a dense layer, that generates the predicted pose pi for the frame by pi=P D(pi−1|$Z_{1:n}$,p1:i−2).

$Z_{1:n}$ is a contextual embedding of the speech input segment S obtained from the spectrograms extracting module 206. Pi−1 is the pose embedding for pose frame i−1. The predicted pose in the pose sequences generating module 208 may be implemented to calculate a regression loss.

In some embodiments, the historical pose sequences are generated from the historical video portions cut from the historical sign language videos by (i) extracting feature maps from each historical video portion, the historical sign language videos are extracted from a plurality of data sources, (ii) generating part confidence maps and part affinity fields based on the feature maps that are extracted, each part confidence map represents a two-dimensional map for body part locations of each user, each joint location of the body part locations has the two-dimensional map, each part affinity field is a two-dimensional vector that encodes a degree of association between the body part locations, and (iii) obtaining, using a bipartite matching method, the historical pose sequences of the historical users from the historical video portions by matching the part confidence maps so that no two-part confidence maps share an end point. In some embodiments, the pose sequences generating module 208 uses OpenPose which represents the body poses of the users. The OpenPose may minimize the effect of noisy and missed detections of OpenPose in the pose sequences.

The sign language video generating module 210 automatically generates, using a discriminator of the second machine learning model 108B, a sign language video for the input speech using the plurality of pose sequences and the plurality of spectrograms when the plurality of pose sequences are matched with corresponding the plurality of spectrograms that are extracted.

In some embodiments, the second machine learning model 108B is a matching network. The second machine learning model 108B matches the speech segments and the corresponding sign pose sequence aids in generating sign language videos by back-propagating a conditional GAN loss. In some embodiments, the sign language video is stored in the database 202, which can be used for the same input speech in the future. The system 100 is configured to sync the input speech with the pose sequences, to generate the sign language video. In some embodiments, the system 100 includes a feedback module that enables the user to provide feedback based on the input speech and the sign language video.

Figure 3:
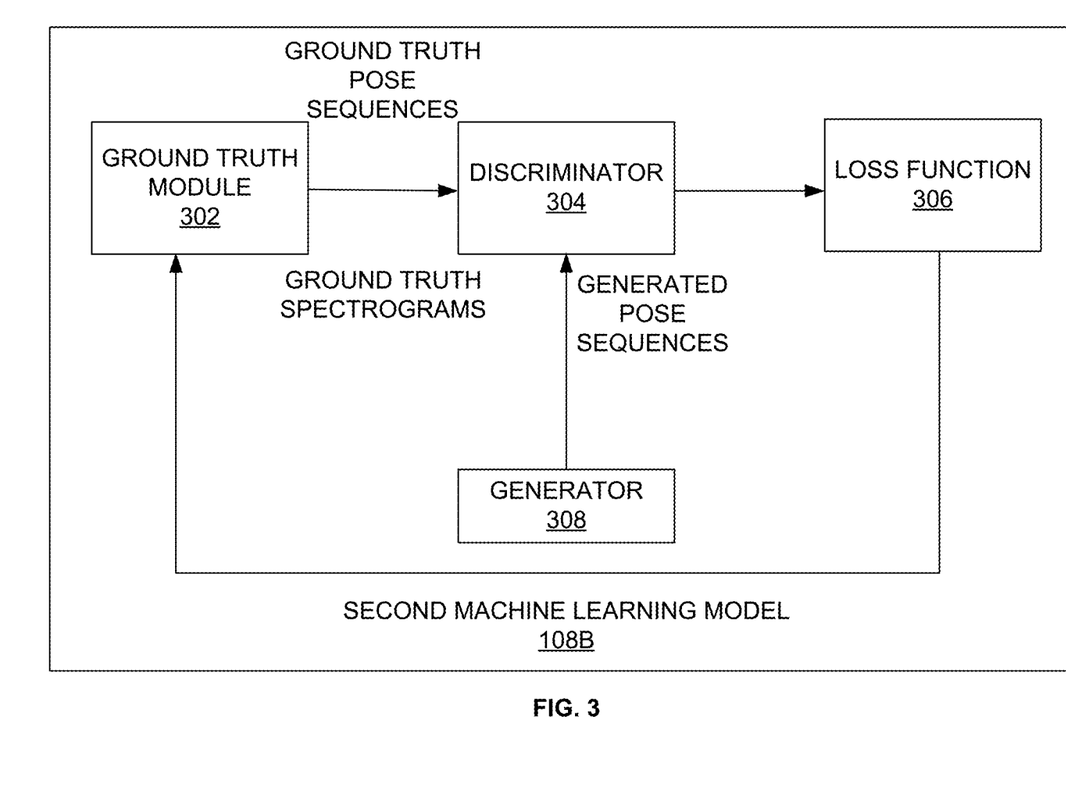
FIG. 3 is a block diagram of a second machine learning model of FIG. 1 according to some embodiments herein.

FIG. 3 is a block diagram of the second machine learning model 108B of FIG. 1 according to some embodiments herein. The second machine learning model 108B includes a ground truth module 302, a discriminator 304, a loss function 306, and a generator 308. The generator 308 generates the plurality of pose sequences, and the sign language video for the input speech. The ground truth module 302 determines ground truth spectrograms, ground truth pose sequences, ground truth input speech. The discriminator 304 discriminates between at least one of ground truth spectrograms, ground truth pose sequences, ground truth input speech, and generated plurality of pose sequences, generated sign language video. The loss function 306 is generated when the discriminator 304 discriminates between at least one of ground truth spectrograms, ground truth pose sequences, ground truth input speech, and generated plurality of pose sequences, generated sign language video.

The discriminator 304 is configured to match the speech segments with the pose sequence. The pose sequence may be predicted sign poses. In some embodiments, the discriminator 304 includes a separate speech and pose embedding layers that learns a high dimensional embedding of the input speech and the pose sequence.

The generator 308 is configured to input the Mel spectrogram of the input speech from the speech encoder. In some embodiments, the generator 308 embeds the Mel Spectrogram accurately. The generator 308 may include a positional encoder that encodes the Mel Spectrogram according to the previous time step and the current time step. The generator 308 is configured to input the predicted sign poses from the pose decoder. In some embodiments, the generator 308 embeds the predicted sign poses accurately. The generator 308 may include a positional encoder that encodes the predicted sign poses according to the previous time step and the current time step.

The generator 308 associates with the speech embedding and the pose embedding, that is configured to learn attention aware representations for the modalities. In some embodiments, the modalities include any of the input speech and the pose sequence. The generator 308 is configured to fuse the modalities that learns to embed the speech segments of the input speech into the pose sequence. In some embodiments, the generator 308 learns a relationship between the input speech and the pose sequence. The generator 308 may merge the speech segments with the pose sequence. The generator 308 is configured to apply attention to the fused embedding of two modalities and to find whether the two modalities match or not.

In some embodiments, the discriminator 304 includes a decision module that determines a probability signifying "match" or "no-match" for the created sign language video.

The generator 308, and the discriminator 304, compete in a min-max function as follows:

$$\min_G \max_D \mathcal{L}_{GAN}(G, D) = \mathbb{E}[\log(D(X \mid Y)] + \mathbb{E}[\log(1 - D(G(\hat{X} \mid Y)]$$

X is the generated pose sequence, X is the target pose sequence, and Y represents the ground truth input speech. An overall loss for the network is given as a weighted sum of losses with a formula:

$$\mathcal{L}_{Total} = \lambda_{Reg} \mathcal{L}_{Reg} + \lambda_{Xent} \mathcal{L}_{Xent} + \lambda_{GAN} \mathcal{L}_{GAN}$$

$\lambda_{Reg}$ is the regression loss weight, $\lambda_{Xent}$ is the recognition loss weight, and $\lambda_{GAN}$ is the weight for adversarial loss.

Figure 4:
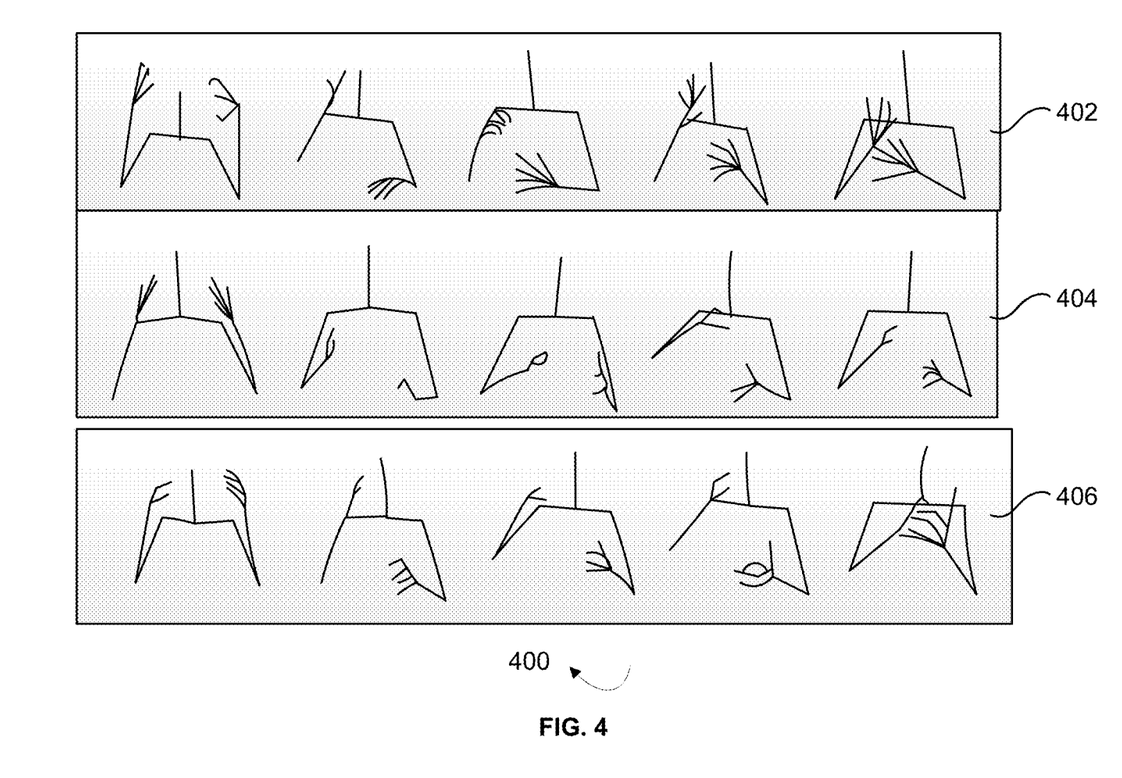
FIG. 4 illustrates an exemplary representation of comparison between pose sequences that are generated by existing solutions and pose sequences that are generated by the system of FIG. 1 according to some embodiments herein.

FIG. 4 illustrates an exemplary representation 400 of comparison between pose sequences that are generated by existing solutions and pose sequences that are generated by the system of FIG. 1 according to some embodiments herein.

The exemplary representation 400 includes ground truth pose sequences at 402, pose sequences that are generated by an existing solution at 404, and pose sequences that are generated by the system 100 at 406.

The system 100 may use an embedding size of $d_{model}=512$, N=2 layers and number of heads, M=8. In some embodiments, the system 100 uses Xavier initialization and Adam optimizer with an initial learning rate of $10^{-3}$ for training the multi-task transformer and the cross modal discriminator. Data augmentations like predicting multiple-frame poses may be determined at each time step. In some embodiments, the system 100 predict 10 frames at every time step to penalize the network heavily for producing mean pose sequences.

In some embodiments, quality of the generated sign language pose sequences can be evaluated using Dynamic Time Warping (DTW) and Probability of Correct Key points (PCK) scores. The DTW may find an optimal alignment between two time series by non-linearly warping the pose sequences. The PCK may be used in pose detections and generation to evaluate the probability of pose key points to be close to the ground truth key points.

Figure 5:
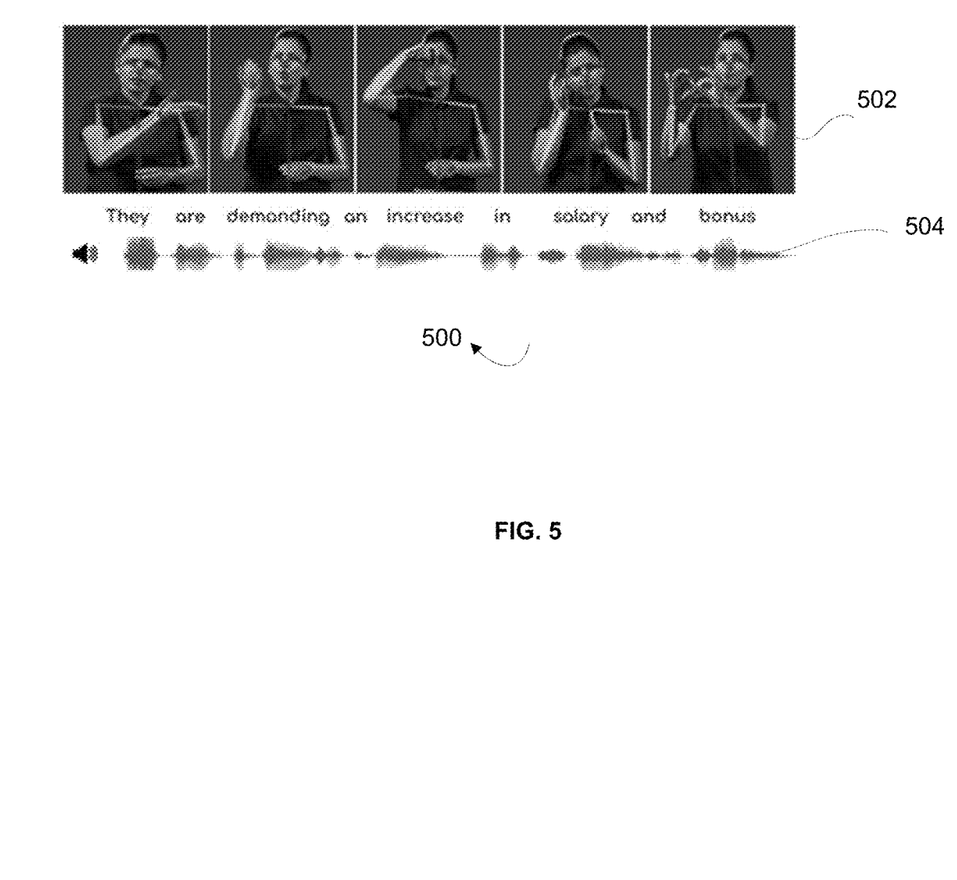
FIG. 5 is an exemplary representation of a sign language video that is automatically generated for an input speech according to some embodiments herein.

FIG. 5 is an exemplary representation 500 of a sign language video that is automatically generated for an input speech according to some embodiments herein. The exemplary representation 500 includes different pose sequences at 502 and one or more spectrograms at 504. The pose sequences at 502 are matched with corresponding one or more spectrograms at 504 to generate the sign language video using the machine learning model.

Figure 6:
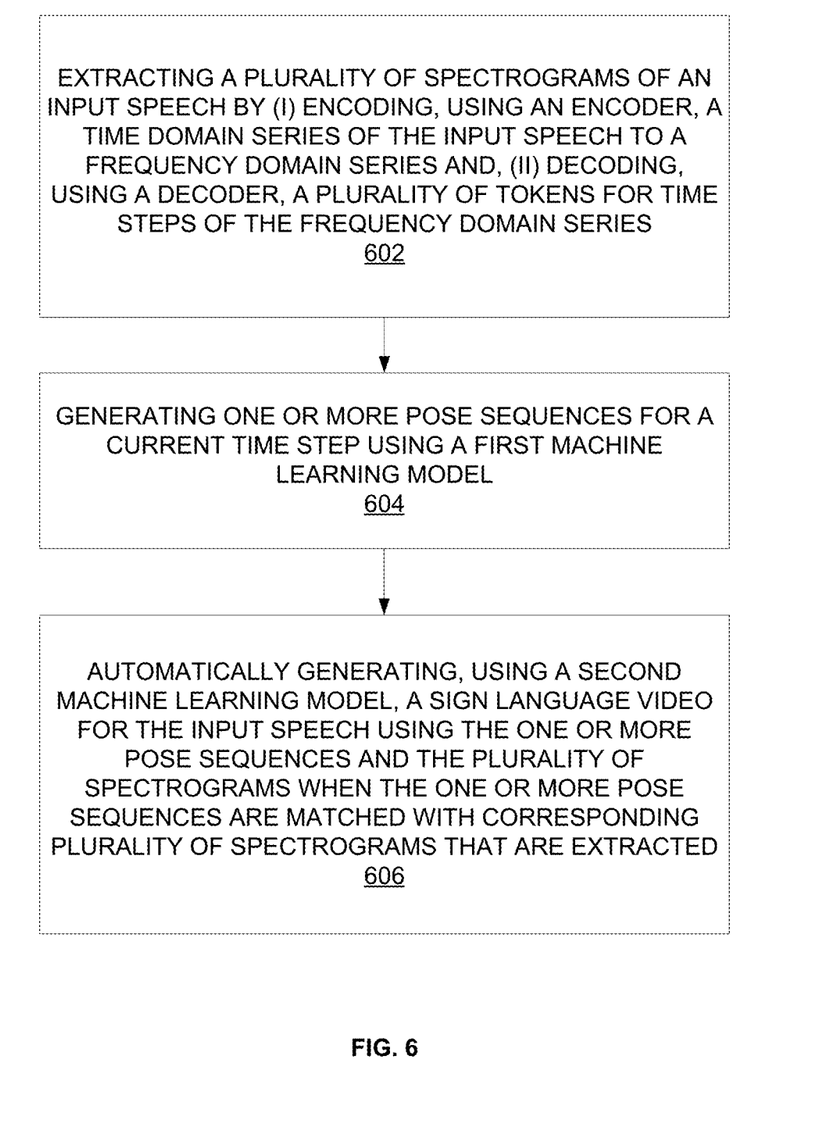
FIG. 6 illustrates a flow diagram of a method of for automatically generating a sign language video from an input speech using the machine learning model of FIG. 1 according to some embodiments herein.

FIG. 6 illustrates a flow diagram of a method for automatically generating a sign language video from an input speech using the machine learning model of FIG. 1 according to some embodiments herein. At the step 602, the method includes extracting a plurality of spectrograms of an input speech by (i) encoding, using an encoder, a time domain series of the input speech to a frequency domain series, and (ii) decoding, using a decoder, a plurality of tokens for time steps of the frequency domain series. Each spectrogram comprises at least one visual representation of a strength of the input speech over time, wherein the input speech is obtained from a user device associated with a user. At the step 604, the method includes generating one or more pose sequences for a current time step of the plurality of spectrograms using a first machine learning model. The first machine learning model is trained by correlating historical pose sequences of historical users in historical sign language videos with historical spectrograms of historical input speeches. At the step 606, the automatically generating, using a second machine learning model, a sign language video for the input speech using the one or more pose sequences and the plurality of spectrograms when the one or more pose sequences are matched with corresponding the plurality of spectrograms that are extracted.

In some embodiments, the method includes retraining the second machine learning model with a loss function if there is a discrimination between at least one of ground truth spectrograms, ground truth pose sequences, ground truth input speech and generated plurality of pose sequences, generated sign language video.

In some embodiments, the method includes decoding, using a pose decoder, at least one pose corresponding to each time step in the input speech and inserting a contextual information to the time domain series of the input speech.

In some embodiments, the method includes determining required historical video portions by cutting the historical sign language videos using a start clip and an end clip.

In some embodiments, the method includes generating the historical pose sequences from the historical video portions cut from the historical sign language videos by (i) extracting feature maps from each historical video portion, the historical sign language videos are extracted from a plurality of data sources, (ii) generating part confidence maps and part affinity fields based on the feature maps that are extracted, wherein each part confidence map represents a two-dimensional map for body part locations of each user, wherein each joint location of the body part locations has the two-dimensional map, wherein each part affinity field is a two-dimensional vector that encodes a degree of association between the body part locations, and (iii) obtaining, using a bipartite matching method, the historical pose sequences of the historical users from the historical video portions by matching the part confidence maps so that no two-part confidence maps share an end point.

In some embodiments, the method includes training the second machine learning model using a generative adversarial network (GAN) model that comprises (a) a generator that is trained to (i) generate the plurality of pose sequences, (ii) generate the sign language video for the input speech, and (b) the discriminator that is trained to discriminate between at least one of ground truth spectrograms, ground truth pose sequences, ground truth input speech and generated plurality of pose sequences, generated sign language video.

Figure 7:
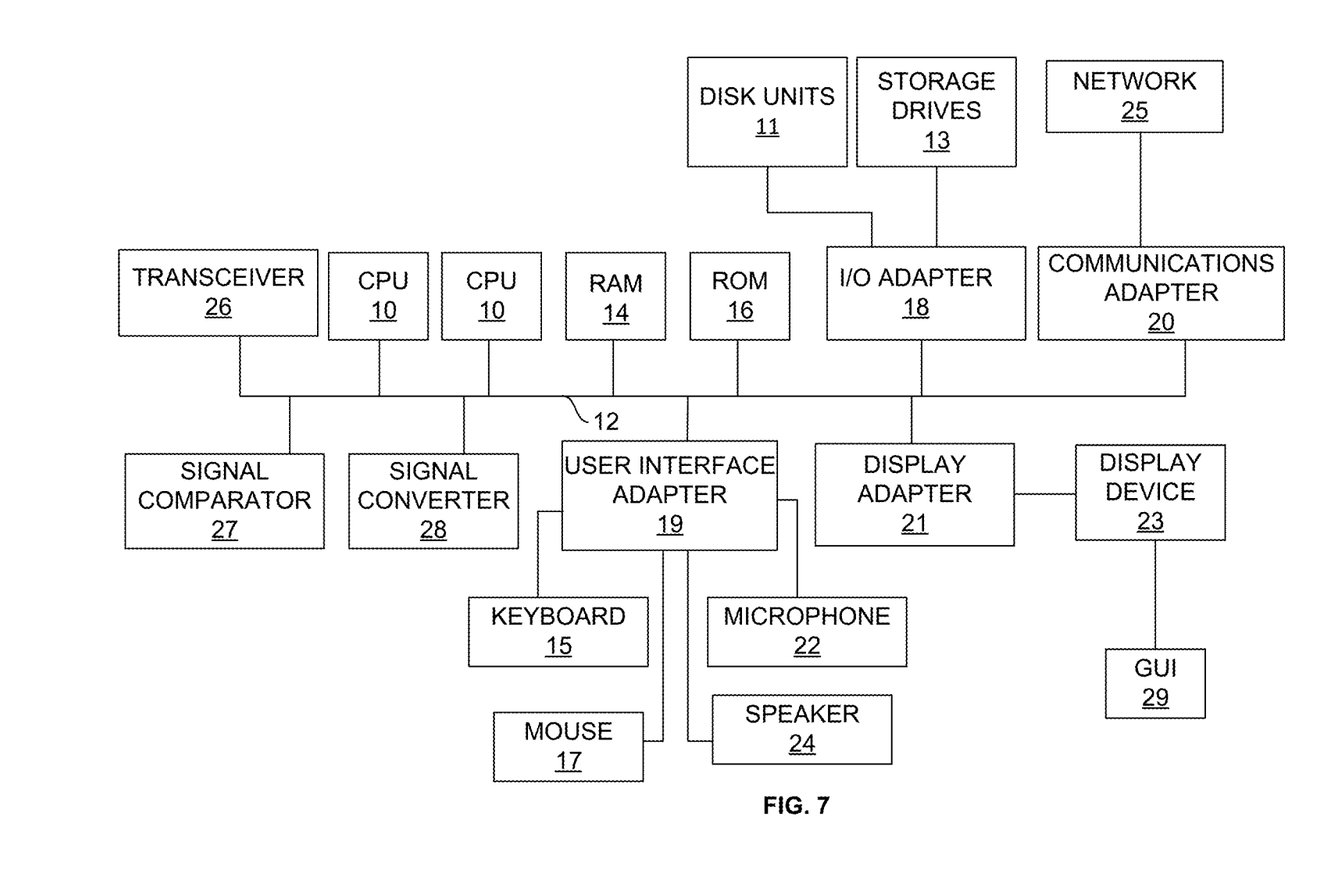
FIG. 7 is a schematic diagram of a computer architecture in accordance with embodiments herein.

A representative hardware environment for practicing the embodiments herein is depicted in FIG. 7, with reference to FIGS. 1 through 6. This schematic drawing illustrates a hardware configuration of a server 106/computer system/computing device in accordance with the embodiments herein. The system includes at least one processing device CPU 10 and at least one graphical processing device GPU 38 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for automatically generating a sign language video from an input speech using a machine learning model, comprising:

generating a sequence of contextual embeddings of a dimension of an input speech by (i) receiving the input speech, (ii) extracting a plurality of spectrograms of the input speech, by encoding, using an encoder, a time domain series of the input speech to a frequency domain series, (iii) projecting the plurality of spectrograms into a dense continuous space using a linear layer, (iv) processing the plurality of projected spectrograms through a plurality of multi-head self-attention layers comprising a plurality of attention heads, (v) processing an output of each multi-head self-attention layer using a corresponding position-wise feed-forward layer, and (vi) applying residual connections and layer normalization to the output of each of the plurality of multi-head self-attention layers and the corresponding position-wise feed-forward layers, wherein each spectrogram comprises at least one visual representation of a strength of the input speech over time, wherein the input speech is obtained from a user device associated with a user;

generating, using a first machine learning model, a plurality of pose sequences for each time step of the sequence of contextual embeddings of the dimension by (i) processing the sequence of contextual embeddings of the dimension using cross-modal attention layers to model a relationship between the contextual embeddings of the dimension and historical pose sequences, and (ii) applying a position-wise feed-forward layer followed by a dense layer on an output of the cross-modal attention layers to generate a predicted pose for each time step in the sequence of contextual embeddings of the dimension, wherein the first machine learning model is trained by correlating the historical pose sequences of historical users in historical sign language videos with historical spectrograms of historical input speeches, wherein the historical pose sequences are generated by (i) receiving, by a pose decoder, a masked pose sequence of dimensionality at previous time steps, (ii) projecting each pose for $i^{th}$ frame in the masked pose sequence, into a dense continuous space using a linear layer, (iii) applying positional encoding to each projected pose, and (iv) processing the pose sequence using a plurality of masked multi-head self-attention layers comprising a plurality of attention heads and residual connections, to generate the historical pose sequences, wherein the historical pose sequences are pose embeddings of dimension; and automatically generating, using a discriminator of a second machine learning model, a sign language video for the input speech when the plurality of pose sequences are matched with the corresponding contextual embeddings of the dimension, wherein the second machine learning model is trained by (i) encoding the historical input speech into a first high-dimensional embedding by a speech embedding layer, and encoding the historical pose sequences into a second high-dimensional embedding by a pose embedding layer, (ii) processing the first high-dimensional embedding and the second high-dimensional embedding through respective self-attention layers to obtain an input speech modality and a pose embedding modality, and (iii) fusing the input speech modality with the pose embedding modality by applying a multi-headed cross-attention block, to determine a probability representing whether the historical input speech matches the historical pose sequence.

2. The processor-implemented method of claim 1, wherein the method comprises retraining the second machine learning model with a loss function if there is a discrimination between at least one of ground truth spectrograms, ground truth pose sequences, ground truth input speech, the generated plurality of pose sequences, and the generated sign language video.

3. The processor-implemented method of claim 1, wherein the method comprises decoding, using a pose decoder, at least one pose corresponding to each time step in the input speech and inserting contextual information into the time domain series of the input speech.

4. The processor-implemented method of claim 1, wherein the method comprises determining required historical video portions by cutting the historical sign language videos using a start clip and an end clip.

5. The processor-implemented method of claim 1, wherein the method comprises generating the historical pose sequences from historical video portions cut from the historical sign language videos by
   extracting feature maps from each historical video portion, wherein the historical sign language videos are extracted from a plurality of data sources;
   generating part confidence maps and part affinity fields based on the feature maps that are extracted, wherein each part confidence map represents a two-dimensional map for body part locations of each user, wherein each joint location of the body part locations has the two-dimensional map, wherein each part affinity field is a two-dimensional vector that encodes a degree of association between the body part locations; and
   obtaining, using a bipartite matching method, the historical pose sequences of the historical users from the historical video portions by matching the part confidence maps so that no two-part confidence maps share an end point.

6. The processor-implemented method of claim 1, wherein the method comprises training the second machine learning model using a generative adversarial network (GAN) model that comprises (a) a generator that is trained to (i) generate the plurality of pose sequences, (ii) generate the sign language video for the input speech, and (b) the discriminator that is trained to discriminate between at least one of ground truth spectrograms, ground truth pose sequences, ground truth input speech and generated plurality of pose sequences, generated sign language video.

7. One or more non-transitory computer-readable storage medium storing one or more sequence of instructions, which when executed by one or more processors, causes to perform a method for automatically generating a sign language video from an input speech using a machine learning model, comprising:
   generating a sequence of contextual embeddings of a dimension of an input speech by (i) receiving the input speech, (ii) extracting a plurality of spectrograms of the input speech, by encoding, using an encoder, a time domain series of the input speech to a frequency domain series, (iii) projecting the plurality of spectrograms into a dense continuous space using a linear layer, (iv) processing the plurality of projected spectrograms through a plurality of multi-head self-attention layers comprising a plurality of attention heads, (v) processing an output of each multi-head self-attention layer using a corresponding position-wise feed-forward layer, and (vi) applying residual connections and layer normalization to the output of each of the plurality of multi-head self-attention layers and the corresponding position-wise feed-forward layers, wherein each spectrogram comprises at least one visual representation of a strength of the input speech over time, wherein the input speech is obtained from a user device associated with a user;
   generating, using a first machine learning model, a plurality of pose sequences for each time step of the sequence of contextual embeddings of the dimension by (i) processing the sequence of contextual embeddings of the dimension using cross-modal attention layers to model a relationship between the contextual embeddings of the dimension and historical pose sequences, and (ii) applying a position-wise feed-forward layer followed by a dense layer on an output of the cross-modal attention layers to generate a predicted pose for each time step in the sequence of contextual embeddings of the dimension, wherein the first machine learning model is trained by correlating the historical pose sequences of historical users in historical sign language videos with historical spectrograms of historical input speeches, wherein the historical pose sequences are generated by (i) receiving, by a pose decoder, a masked pose sequence of dimensionality at previous time steps, (ii) projecting each pose for $i^{th}$ frame in the masked pose sequence, into a dense continuous space using a linear layer, (iii) applying positional encoding to each projected pose, and (iv) processing the pose sequence using a plurality of masked multi-head self-attention layers comprising a plurality of attention heads and residual connections, to generate the historical pose sequences, wherein the historical pose sequences are pose embeddings of dimension; and
   automatically generating, using a discriminator of a second machine learning model, a sign language video for the input speech when the plurality of pose sequences are matched with the corresponding contextual embeddings of the dimension, wherein the second machine learning model is trained by (i) encoding historical input speech into a first high-dimensional embedding by a speech embedding layer, and encoding the historical pose sequences into a second high-dimensional embedding by a pose embedding layer, (ii) processing first high-dimensional embedding and the second high-dimensional embedding through respective self-attention layer to obtain input speech modality and pose embedding modality, and (iii) fusing the input speech modality with the pose embedding modality by applying a multi-headed cross-attention block, to determine a probability representing whether the historical input speech matches the historical pose sequence.

8. A system for automatically generating a sign language video from an input speech using a machine learning model, the system comprising:
   a device processor; and
   a non-transitory computer-readable storage medium storing one or more sequences of instructions, which when executed by the device processor, causes:
      generate a sequence of contextual embeddings of a dimension of an input speech by (i) receiving the input speech, (ii) extract a plurality of spectrograms of the input speech by encoding, using an encoder, a time domain series of the input speech to a frequency domain series, (iii) projecting the plurality of spectrograms into a dense continuous space using a linear layer, (iv) processing the plurality of projected spectrograms through a plurality of multi-head self-attention layers comprising a plurality of attention heads, (v) processing an output of each multi-head self-attention layer using a corresponding position-wise feed-forward layer, and (vi) applying residual connections and layer normalization to the output of each of the plurality of multi-head self-attention layers and the corresponding position-wise feed-forward layers, wherein each spectrogram comprises at least one visual representation of a strength of the input speech over time, wherein the input speech is obtained from a user device associated with a user;

generate using a first machine learning model, a plurality of pose sequences for each time step of the sequence of contextual embeddings of the dimension by (i) processing the sequence of contextual embeddings of the dimension using cross-modal attention layers to model a relationship between the contextual embeddings of the dimension and historical pose sequences, and (ii) applying a position-wise feed-forward layer followed by a dense layer on an output of the cross-modal attention layers to generate a predicted pose for each time step in the sequence of contextual embeddings of the dimension, wherein the first machine learning model is trained by correlating the historical pose sequences of historical users in historical sign language videos with historical spectrograms of historical input speeches, wherein the historical pose sequences are generated by (i) receiving, by a pose decoder, a masked pose sequence of dimensionality at previous time steps, (ii) projecting each pose for $i^{th}$ frame in the masked pose sequence, into a dense continuous space using a linear layer, (iii) applying positional encoding to each projected pose, and (iv) processing the pose sequence using a plurality of masked multi-head self-attention layers comprising a plurality of attention heads and residual connections, to generate the historical pose sequences, wherein the historical pose sequences are pose embeddings of dimension; and automatically generate, using a discriminator of a second machine learning model, a sign language video for the input speech when the plurality of pose sequences are matched with the corresponding contextual embeddings of the dimension, wherein the second machine learning model is trained by (i) encoding historical input speech into a first high-dimensional embedding by a speech embedding layer, and encoding the historical pose sequences into a second high-dimensional embedding by a pose embedding layer, (ii) processing first high-dimensional embedding and the second high-dimensional embedding through respective self-attention layer to obtain input speech modality and pose embedding modality, and (iii) fusing the input speech modality with the pose embedding modality by applying a multi-headed cross-attention block, to determine a probability representing whether the historical input speech matches the historical pose sequence.

9. The system of claim 8, wherein the processor is configured to determine historical required historical video portions by cutting the historical sign language videos using a start clip and an end clip.

10. The system of claim 8, wherein the processor is configured to decode, using a pose decoder, at least one pose corresponding to each time step in the input speech and insert contextual information into the time domain series of the input speech.

11. The system of claim 8, wherein the historical pose sequences are generated from historical video portions cut from the historical sign language videos by
extracting feature maps from each historical video portion, wherein the historical sign language videos are extracted from a plurality of data sources;
generating part confidence maps and part affinity fields based on the feature maps that are extracted, wherein each part confidence map represents a two-dimensional map for body part locations of each user, wherein each joint location of the body part locations has the two-dimensional map, wherein each part affinity field is a two-dimensional vector that encodes a degree of association between the body part locations; and
obtaining, using a bipartite matching method, the historical pose sequences of the historical users from the historical video portions by matching the part confidence maps so that no two-part confidence maps share an end point.

12. The system of claim 8, wherein the processor is configured to train the second machine learning model using a generative adversarial network (GAN) model that comprises (a) a generator that is trained to (i) generate the plurality of pose sequences, (ii) generate the sign language video for the input speech, and (b) the discriminator that is trained to discriminate between at least one of ground truth spectrograms, ground truth pose sequences, ground truth input speech and generated plurality of pose sequences, generated sign language video.

13. The system of claim 8, wherein the processor is configured to retrain the second machine learning model with a loss function if there is a discrimination between at least one of ground truth spectrograms, ground truth pose sequences, ground truth input speech, the generated plurality of pose sequences, and the generated sign language video.

* * * * *